United States Patent [19]

Reusens

[11] Patent Number: 4,803,437

[45] Date of Patent: Feb. 7, 1989

[54] DIGITAL TRANSMISSION SYSTEM

[75] Inventor: Peter P. F. Reusens, Destelbergen, Belgium

[73] Assignee: Alcatel N.V., Amsterdam, Netherlands

[21] Appl. No.: 84,250

[22] Filed: Aug. 12, 1987

[30] Foreign Application Priority Data

Aug. 12, 1986 [BE] Belgium .............................. 2/61029

[51] Int. Cl.[4] ........................ H03K 3/017; H03K 3/02
[52] U.S. Cl. ...................................... 328/59; 307/261;
307/265; 307/269; 307/271; 328/61; 328/15
[58] Field of Search ............... 307/240, 261, 269, 271,
307/522, 529, 269; 328/15, 25, 59, 61

[56] References Cited

U.S. PATENT DOCUMENTS 4,540,945  9/1985  Kuroki ............................... 307/271

Primary Examiner—John Zazworsky
Attorney, Agent, or Firm—Spencer & Frank

[57] ABSTRACT

A signal generator for generating a modulated output signal from a clock signal. The generator comprises a divider means which derives from the clock signal a square wave having a first fundamental frequency. Means connected to the divider means also provides from the clock signal a rectangular wave signal having a second fundamental frequency that is an even integral multiple of the first fundamental frequency. A chopper chops the square wave signal by the rectangular wave signal to provide the output signal. The frequency content of the spectrum of the output signal is the same as that of the square wave signal.

15 Claims, 3 Drawing Sheets

DIGITAL TRANSMISSION SYSTEM

FIELD OF THE INVENTION

The present invention relates to digital transmission systems and more particularly to a digital transmission system including a signal generator in which a chopper circuit chops an input signal.

BACKGROUND OF THE INVENTION

Such signal generators are already known in the art, e.g. from the book "PULSE, DIGITAL, AND SWITCHING WAVEFORMS" by MILLMAN and TAUB, edited by McGRAW-HILL, 1965, pp. 647 to 649, (Sec. 17-13: CHOPPER AMPLIFIERS).

In this known generator, the frequency spectrum of the output signal is dependent on the frequency spectrum of both the input and the chopper signals since it contains mixing products of the constituent frequencies of these signals.

SUMMARY OF THE INVENTION

An object of the present invention is to provide a signal generator of the above type but wherein the frequency spectrum of the output signal is substantially affected only by the frequency spectrum of the input signal. This means that the output signal will not contain undesired frequencies, i.e., frequencies which are not present in the input signal. Such a generator is particularly, but not exclusively, applicable to the generation of audible tones in a telephone subset by removing the unwanted higher frequencies from the modulated digital output signals.

According to the invention this object is achieved by employing an input signal which is a square wave of a first fundamental frequency and a chopper signal which is a rectangular wave the fundamental frequency of which is an even multiple of said first fundamental frequency.

In this way, the frequency content of the spectrum of the output signal is identical to that of the input signal, because the frequencies of the mixing products produced by the chopping operation coincide with the frequencies of the harmonics of the input signal. Thus, the output signal does not contain frequencies which are not present in the input signal and which could generate, in case of an audio application, undesired audible sounds. This means that, provided this frequency ratio is maintained, the frequency of the output signal can be varied in a simple manner, particularly by digital control and still keep the desired ratio of the two fundamental frequencies.

Another characteristic feature of the present invention is that the signal generator includes means for modifying the duty cycle of the rectangular wave. This affords a way to modify the amplitude of the output signal.

Accordingly, one of the advantages of such a digital signal generator endowing a chopper circuit with output signals of variable frequency and amplitude, is that one may now produce such signals without resorting to memories storing digital values corresponding to instantaneous amplitudes of the desired signals.

DESCRIPTION OF THE PREFERRED EMBODIMENT

Figure 1:
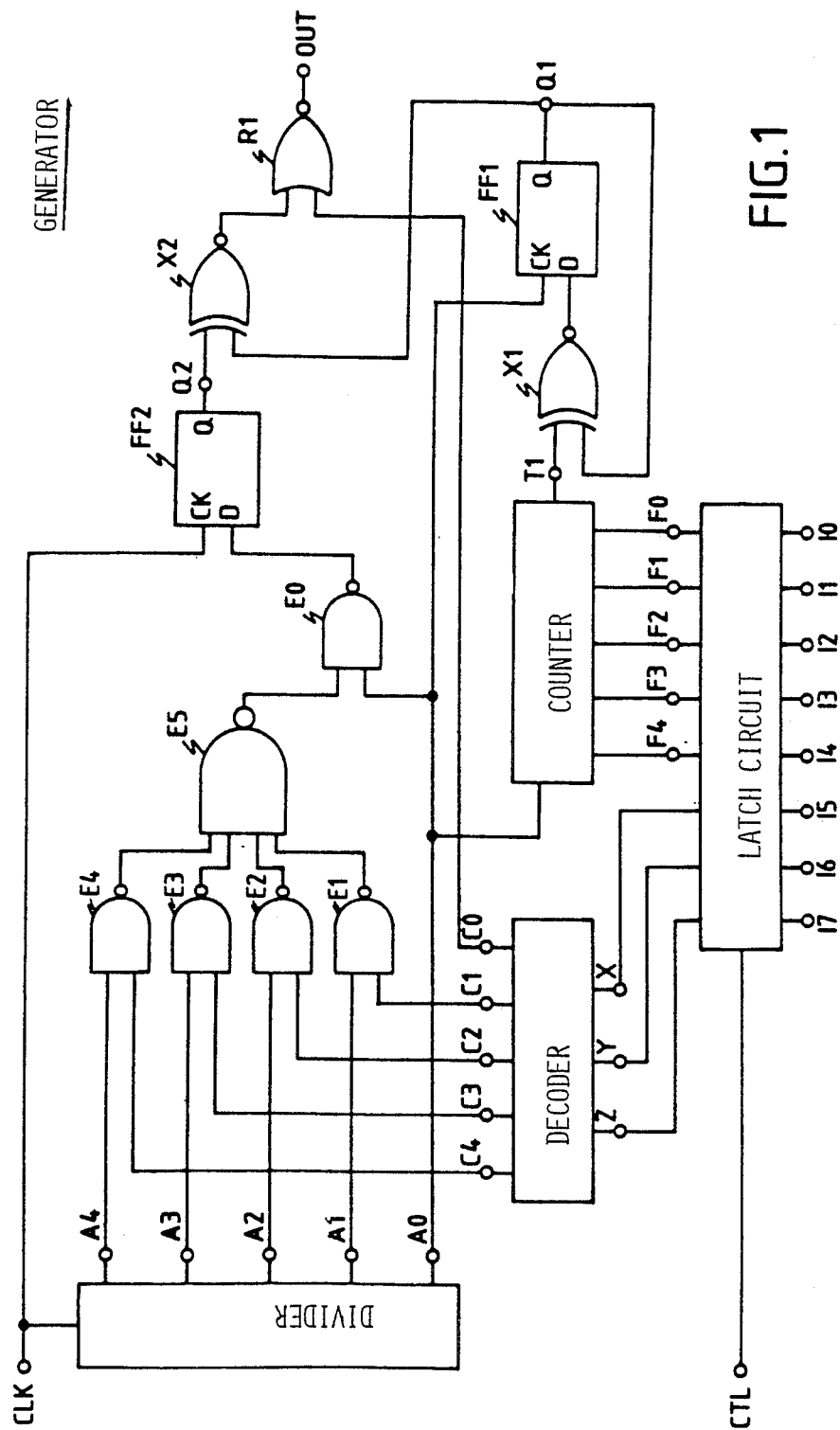
FIG. 1 is a schematic diagram of a signal generator which is a preferred embodiment of the invention.

The signal or tone generator GEN shown in FIG. 1 is used in a telecommunication system and more particularly in a telephone subset to generate audible tone and ringing signals having a frequency and an amplitude which are selectable by an incoming 8 bits digital word, the data input. Each bit of this digital word is applied to a distinct input terminal I0/17 of a latch circuit LAT, the data input means. The 5 least significant bits LSB (tone frequency selecting bits) of the digital word appearing at output terminals F0/4 of the latch circuit LAT are used to select the frequency of the tone, whilst the 3 remaining most significant bits MSB (the duty cycle selecting bits) appearing at output terminals X, Y and Z of latch circuit LAT are used to select the amplitude these being the duty cycle control bits of this tone. The operation of the latch circuit LAT is controlled via a control terminal CTL.

The tone generator GEN is driven by a 2,048 kHz clock signal CLK supplied at an input terminal CLK.

The part of tone generator GEN controlling the frequency of the tone includes a counter CNT coupled latch circuit LAT via the terminals F0/4. The counter CNT is controlled by a 32 kHz signal SA0 (FIGS. 3 and 4) supplied at a terminal A0 (FIG. 1) of a divider DIV which derives this signal SA0 from the 2,048 kHz clock signal CLK as will be explained later. The counter CNT has an output terminal T1 which is connected to a first input of an exclusive-NOR gate X1 whose output is connected to the data input D of a clocked D-flipflop FF1. The Q output terminal Q1 of flip-flop FF1 is fed back to a second input of the gate X1 and is also connected to a first input of another exclusive-NOR gate X2 whilst the above terminal A0 is connected to the clock input CK of flip-flop FF1. The NOR gate X1 and flip-flop FF1 provide a divide-by-two circuit. As will be described later, this part of GEN provides at its terminal Q1 a square wave having a frequency adjustable between 500 Hz and 16 Hz equal to the fundamental frequency of the required tone.

The part of the generator GEN controlling the amplitude of the tone includes the above mentioned divider DIV driven by the clock signal CLK. The divider DIV has five output terminals A0/4 each providing a signal whose frequency is a submultiple of the frequency (2,048 kHz) of the clock signal CLK. More particularly, signals with frequencies of 32 kHz, 64 kHz, 128 kHz, 256 kHz and 512 kHz are provided at the terminals A0, A1, A2, A3 and A4 respectively. The terminals A1/4 are each connected to a first input of NAND gates E1/4 a second input of which is connected to a respective output terminals C1/4 of a decoder DEC also included in the generator GEN. The decoder DEC has a fifth output terminal C0 and three input terminals X, Y and Z which are respectively connected to the above mentioned like-lettered output terminals of the latch circuit LAT. The outputs of the NAND gates E1/4 are all connected to the respective four inputs of a NAND gate E5 whose output is connected to a first input of a NAND gate E0. The terminal A0 of the divider DIV is connected to a second input of the gate E0 and the output of the latter is connected to the data input D of a second clocked data D-flipflop FF2. The input terminal CLK is connected to the clock input CK of flip-flop FF2 whose Q output terminal Q2 is connected to a second input of the exclusive-NOR gate (the chopper gate) X2. As will be described later, this part of the generator GEN provides at the terminal Q2 a rectangular wave at 32 kHz whose selectable duty cycle determines the amplitude of the required tone.

The square wave at Q1 is chopped by the rectangular wave at Q2 in the chopper circuit constituted by NOR gate X2. The output of NOR gate X2 and the output terminal C0 of the decoder DEC are respectively connected to a first and a second inputs of a further NOR gate R1. The output of further NOR gate R1 is connected to an output terminal OUT of the generator GEN where a rectangular wave output signal corresponding to the required tone is available. A loudspeaker (not shown) connected to this terminal OUT, e.g. via a low pass filter circuit, may transform this output signal into sound.

Figure 2:
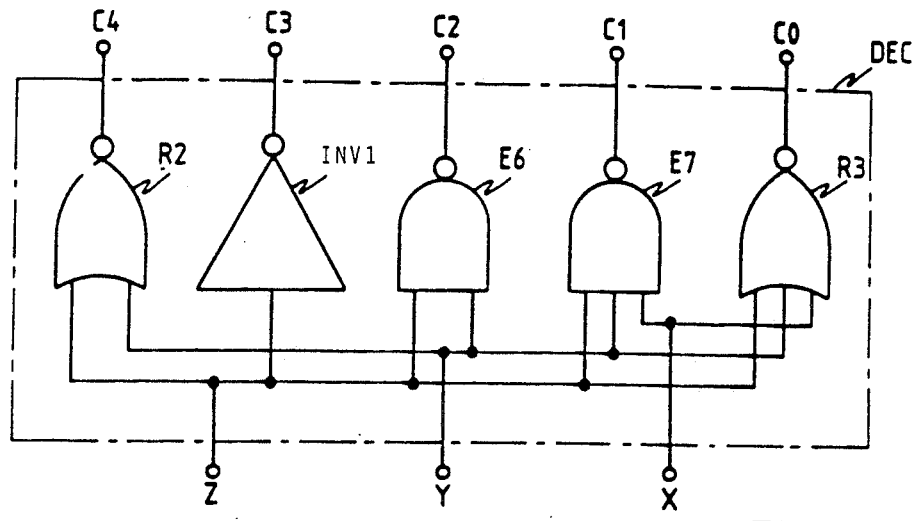
FIG. 2 is a view of the logic circuits of a decoder of FIG. 1.

The decoder DEC is represented in more detail in FIG. 2. It comprises two NOR gates R2 and R3, two NAND gates E6 and gates E7 and one inverter INV1. Gates R2 and E6 each have two inputs respectively connected to the terminals Y and Z, INV1 has its input connected to terminal Z whilst E7 and R3 each have three inputs respectively connected to terminals X, Y and Z. THe outputs of gates R3, E7, E6, inverter INV1 and gate R2 are connected to the terminals C0, C1, C2, C3 and C4 respectively. The truth table of the decoder DEC is as follows:

TABLE I

| Z | Y | X | C4 | C3 | C2 | C1 | C0 |
|---|---|---|----|----|----|----|----|
| 0 | 0 | — | 0  | 1  | 1  | 1  | 1  |
| 0 | 0 | 1 | 1  | 1  | 1  | 1  | 0  |
| 0 | 1 | 0 | 0  | 1  | 1  | 1  | 0  |
| 0 | 1 | 1 | 0  | 1  | 1  | 1  | 0  |
| 1 | 0 | 0 | 0  | 0  | 1  | 1  | 0  |
| 1 | 0 | 1 | 0  | 0  | 1  | 1  | 0  |
| 1 | 1 | 0 | 0  | 0  | 0  | 1  | 0  |
| 1 | 1 | 1 | 0  | 0  | 0  | 0  | 0  |

As one can see from this truth table, the decoder DEC only has 6 and not 8 different output combinations since the binary value at terminal X is immaterial when the binary values at the terminals Y and Z are not equal to one another. This is sufficient for the present application (telephony) and simplifies the structure of this decoder DEC which uses only simple logical gates.

In the counter CNT the signal SA0 (FIGS. 3 and 4) of 32 kHz from terminal A0 is divided by a number N which is equal to the two's complement of the binary value of the 5 least significant bits of the I0/4 incoming digital word plus 1. This binary value, stored in the latch circuit LAT, is transmitted to the counter CNT via the terminals F0/4 and is used as start value for counter CNT which increments it to the count 0 at the frequency of 32 kHz. At that time, a pulse is provided at the output terminal T1 and the counter CNT is reset to its start value determined by the bits F0/4. This output signal is transformed into a square wave at Q1 by the divider-by-two circuit constituted by exclusive NOR gate X1 and clocked flip-flop FF1. Indeed, each pulse generated on T1 produces a raising or a falling edge of this square wave so that the frequency of the signal at this terminal Q1 is the half the frequency of the pulses generated at terminal T1. A table indicating the relation between the binary values of these 5 bits at F4/0 and the frequency of the signal at the terminal Q1 is given below:

TABLE II

| F4 | F3 | F2 | F1 | F0 | freq. at Q1 |
|----|----|----|----|----|-------------|
| 0  | 0  | 0  | 0  | 0  | 16000 Hz    |
| 1  | 1  | 1  | 1  | 1  | 8000 Hz     |
| 1  | 1  | 1  | 1  | 0  | 5333 Hz     |
| 1  | 1  | 1  | 0  | 1  | 4000 Hz     |
| 1  | 1  | 1  | 0  | 0  | 3200 Hz     |
| 1  | 1  | 0  | 1  | 1  | 2667 Hz     |
| 1  | 1  | 0  | 1  | 0  | 2286 Hz     |
| 1  | 1  | 0  | 0  | 1  | 2000 Hz     |
| 1  | 1  | 0  | 0  | 0  | 1778 Hz     |
| 1  | 0  | 1  | 1  | 1  | 1600 Hz     |
| 1  | 0  | 1  | 1  | 0  | 1455 Hz     |
| 1  | 0  | 1  | 0  | 1  | 1333 Hz     |
| 1  | 0  | 1  | 0  | 0  | 1231 Hz     |
| 1  | 0  | 0  | 1  | 1  | 1143 Hz     |
| 1  | 0  | 0  | 1  | 0  | 1067 Hz     |
| 1  | 0  | 0  | 0  | 1  | 1000 Hz     |
| 1  | 0  | 0  | 0  | 0  | 941 Hz      |
| 0  | 1  | 1  | 1  | 1  | 889 Hz      |
| 0  | 1  | 1  | 1  | 0  | 842 Hz      |
| 0  | 1  | 1  | 0  | 1  | 800 Hz      |
| 0  | 1  | 1  | 0  | 0  | 762 Hz      |
| 0  | 1  | 0  | 1  | 1  | 727 Hz      |
| 0  | 1  | 0  | 1  | 0  | 696 Hz      |
| 0  | 1  | 0  | 0  | 1  | 667 Hz      |
| 0  | 1  | 0  | 0  | 0  | 640 Hz      |
| 0  | 0  | 1  | 1  | 1  | 615 Hz      |
| 0  | 0  | 1  | 1  | 0  | 593 Hz      |
| 0  | 0  | 1  | 0  | 1  | 571 Hz      |
| 0  | 0  | 1  | 0  | 0  | 552 Hz      |
| 0  | 0  | 0  | 1  | 1  | 533 Hz      |
| 0  | 0  | 0  | 1  | 0  | 516 Hz      |
| 0  | 0  | 0  | 0  | 1  | 500 Hz      |

For instance, when the start value at the terminals F4/0 has the binary value 00001, the 32 kHz signal SA0 from terminal A0 is divided by the binary value 100000 in the counter CNT and the resulting signal at Q1 has a frequency of 500 Hz which is the lowest possible frequency at Q1. On the other hand, the highest frequency on Q1 is obtained when the start value F0/4 has the binary value 00000 and is equal to 16 kHz.

The 500 Hz to 16 kHz square wave signal provided at terminal Q1 has an amplitude of, e.g., 5 Volts peak to peak and this is the maximum possible amplitude of the tone generated on terminal OUT. In order to obtain a tone with a selectable amplitude, this square wave signal generated on Q1 is chopped by the above mentioned rectangular wave at 32 kHz from terminal A0 and which has a selectable duty cycle. The resulting rectangular signal generated on terminal OUT still has an amplitude of 5 Volts peak to peak but the amplitude of the corresponding audible sound is reduced according to the value of the duty cycle of the rectangular wave. Such a rectangular wave with a variable duty cycle or pulse width is provided by the part of the generator GEN controlling the amplitude of the output signal, as will be explained hereinafter.

The amplitude of the output signal of the generator GEN is determined by the 3 MSB I5/7 (duty cycle selecting bits) of the digital word. These 3 bits, which are stored in the latch circuit LAT, are applied to the decoder DEC via the terminals X, Y and Z so that a corresponding digital output number appears at the terminals C0/4 in accordance with the above given truth table of DEC.

Figure 3:
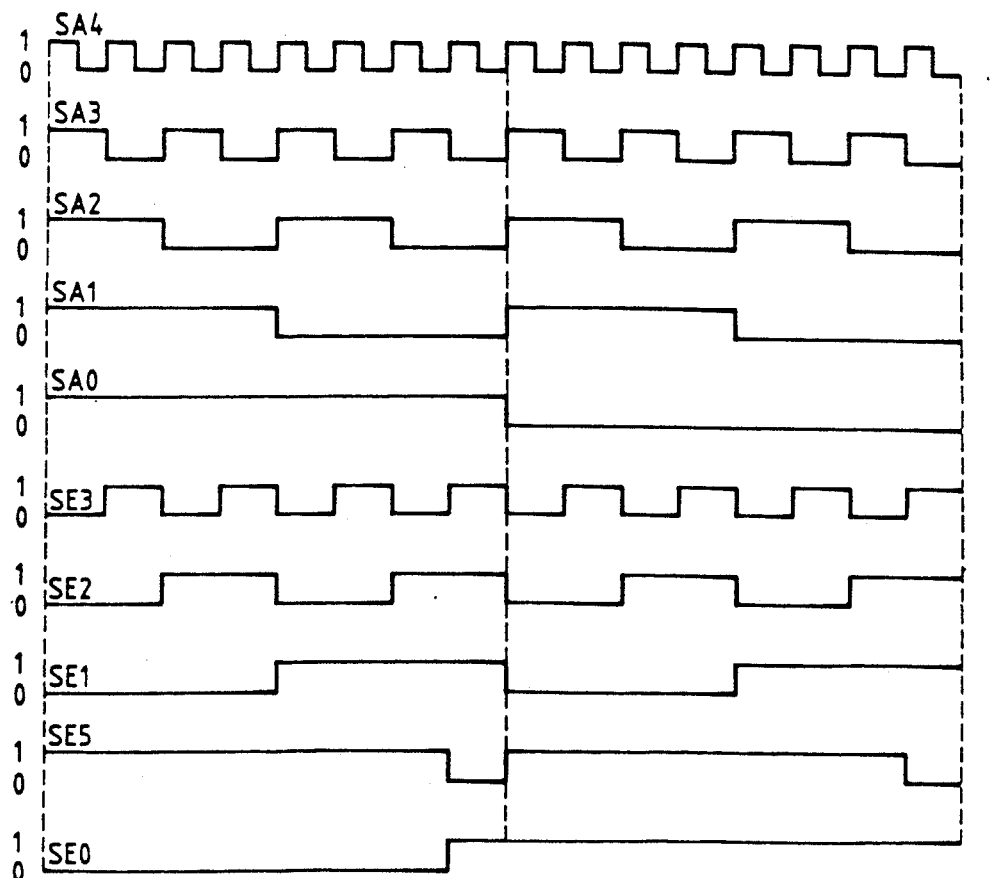
FIG. 3 represents various waveforms which may be generated in the signal generator.

The divider DIV uses the 2,048 kHz clock signal CLK to supply square wave frequency signals SA4/0 as shown in FIG. 3. The signals SA4 of 512 kHz, SA3 of 256 kHz, SA2 of 128 kHz, SA1 of 64 kHz and SA0 of 32 kHz are supplied at the output terminals A4, A3, A2, A1 and A0 respectively. As already mentioned, the 32 kHz signal SA0 supplied at terminal A0 is used by the counter CNT and flip-flop FF1. Each of the other frequency signals SA4/1 from divider outputs A4/1 is sent to one of the corresponding NAND gates E4/1 where it is combined with a bit of the digital output number at the terminals C4/1.

In the operation of the signal generator GEN it is assumed, as an example, that the binary values of the duty cycle selecting 3 bits at the terminals Z, Y and X (or I7, I6 and I5) are equal to 0, 1 and 1 respectively. The digital output number of C4/0 is thus equal to 01110 and the signals at the outputs of gates E4 to E1 are respectively equal to 1 (continuously), SE3, SE2 and SE1, the three last signals being shown in FIG. 3. These four output signals are then combined in the NAND gate E5 and the resultant signal SE5 at the output of the latter is a rectangular wave. When this signal SE5 is combined in the NAND gate E0 with the 32 kHz square wave SA0 on terminal A0 it becomes a rectangular wave SE0 shown in the FIGS. 3 and 4.

In practice the change of the binary value of the signals at the outputs of gates E5 to E1 is not instantaneous so that the NAND gate operation on these signals may generate unwanted pulses which appear in the output signal SE0 of NAND gate E0, especially when the binary value of the latter signal SE0 is not changed. To suppress such unwanted pulses, the data D-flipflop FF2 samples the signal SE0 at the clock frequency CLK of 2,048 kHz when the binary value of the signal SE0 is stable, i.e. not during the above transient states. The binary value of each sample is then provided at the output terminal Q2 of flip-flop FF2 which remains in this state until a new sample is taken. Thus, the purpose of FF2 is to reshape the signal SE0 so that the signal at the terminal Q2 is in fact identical to the desired ideal value of signal SE0 at the output of E0.

As already mentioned, the square wave at terminal Q1 and the rectangular wave SE0 at terminal Q2 are both applied to the chopper circuit of exclusive NOR gate X2 in order to produce on the terminal OUT a rectangular wave corresponding to the desired tone.

Figure 4:
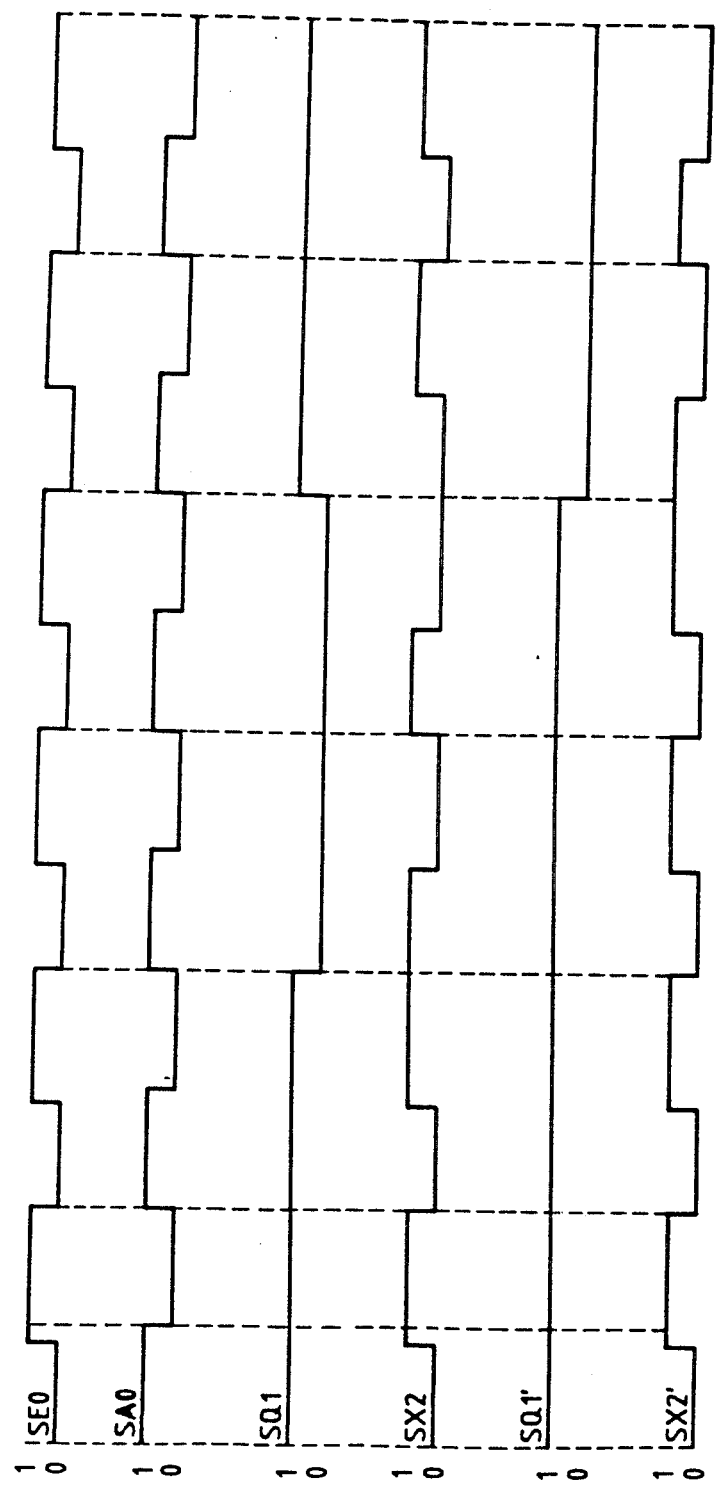
FIG. 4 also represents various waveforms which may be generated in this generator but drawn at a different scale factor from that of FIG. 3.

The operation of the part of generator GEN including the chopper circuit X2 is described hereinafter by means of two examples of wave shapes shown in FIG. 4. It is first to be noted that when the binary values at the terminals Z, Y and X are all three at 0 the binary value at the terminal C0 is 1 according to the truth Table I. Since this binary value 1 is brought to the second input of the NOR gate R1 the output of the latter is permanently forced to the binary value 0 so that no signal is then available at the output terminal OUT. This case is not considered in the following two examples.

In a first example, the signal SQ1 (note FIG. 4) at the terminal Q1 has a frequency of 8 kHz so that the signal at the output of X2 and therefore also at the output terminal OUT is a rectangular wave SX2. Similarly, in a second example, the signal SQ1' at Q1 has a frequency of 4 kHz so that the signal at OUT is then a rectangular wave SX2'.

As mentioned above, the amplitude of the sound is zero when the terminals Z, Y and X are all three at the binary value 0. By increasing the value of the digital number applied to these terminals Z, Y and X, the modified duty cycle of the rectangular signal at OUT causes the amplitude of the corresponding sound to increase logarithmically as indicated in the truth table I. As appears from the latter, five different non zero (C0=0) audio levels, i.e. corresponding to $-24$ dB, $-18$ dB, $-12$ dB, $-6$ dB and 0 dB respectively, can be provided. These five values, successively doubling the amplitude, correspond respectively to 0 bits for C1 to C4, C2 to C4, C3 and C4, C4 and none, i.e. 1 bits for C1 to C4.

Since the square wave SQ1 or SQ1' is chopped by the rectangular wave SE0, mixing products corresponding to the sum and to the difference of the fundamental frequencies or of their harmonics are created. However, because by definition a square wave only contains odd harmonics and the 32 kHz frequency of the chopping signal SE0 is an even harmonic of the 500 Hz to 16 kHz frequency of the square wave SQ1 or SQ1', these mixing products coincide with the odd harmonics and do not add unwanted mixing products to the frequency content of the spectrum of the square wave which correspond therefore to the spectrum of that of the output signal at terminal OUT.

Indeed, the chopper signal SE0 contains all the harmonics of the 32 kHz frequency including a DC component. Symbolically, one may write $$SE0 = \Sigma A_i \cdot \sin(i \cdot 2\pi f_1 + \phi_i)$$

where $A_i$ is the amplitude, $\phi_i$ the phase, $f_1$ the 32 kHz frequency and i a variable taking integral values from zero to infinity. On the other hand and as indicated above, the square wave SQ1 has a fundamental frequency $f_0$ which is equal to the frequency $f_1$ divided by 2 and by N, an integer larger or equal to 1 and smaller or equal to 32. One may write $$SQ1 = \Sigma B_j \cdot \sin[(2j+1) \cdot 2\pi f_0 + \phi_j]$$

where $B_j$ is the amplitude, $\phi_j$ the phase, $f_0$ the frequency and j a variable taking integral values from zero to infinity.

By multiplying SE0 and SQ1 one obtains an output signal with frequencies which are the sum and the difference of all the possible harmonics of SE0 and SQ1. These frequencies f are equal to $$f = (2j+1) \cdot f_0 \pm i \cdot 2N \cdot f_0$$

and thus are all odd harmonics of the fundamental frequency $f_0$. For this reason, no unwanted harmonic is generated.

While the principles of the invention have been described above in connection with specific apparatus, it is to be clearly understood that this description is made only by way of example and not as a limitation on the scope of the invention.

I claim:

1. A signal generator for generating a modulated output signal from a clock signal comprising:
   a divider means connected to provide from the clock signal a square wave signal having a first fundamental frequency;
   means connected to the divider means to provide from the clock signal a rectangular wave signal having a second fundamental frequency which is an even integral multiple of the first fundamental frequency of said square wave signal; and a chopper means connected to chop the square wave signal by the rectangular wave signal as a chopping signal to provide the modulated output signal.

2. A signal generator as claimed in claim 1, the rectangular wave signal having a duty cycle, said signal generator further comprising means for controlling said duty cycle.

3. A signal generator means as claimed in claim 2, further comprising a data input means, the means for controlling the duty cycle of the rectangular wave signal being connected to be responsive to the data input means.

4. A signal generator as claimed in claim 3, said data input means having tone frequency selecting binary digits, said divider means including a first divider circuit providing a control signal at the frequency of the rectangular wave signal, a divider facility including a counter having an output and connected to divide the frequency of the said control signal in response to the tone frequency selecting digits of the data input means, and a divide-by-two frequency divider connected to divide by two the frequency of the output signal of the counter to provide the square wave signal frequency.

5. A signal generator as claimed in claim 3, the duty cycle controlling means including the divider means, a decoder, and a combiner circuit, the divider means supplying a submultiple of the clock signal, the combining means being connected to receive the submultiple of the clock signal and to provide the rectangular chopping signal in response to (a) the divider means and (b) the decoder, the data input means having duty cycle selecting bits, the decoder being connected to respond to the duty cycle selecting bits, the combining means thereby providing the rectangular chopping signal as an output of the combiner circuit with a duty cycle modified in response to the duty cycle selecting bits.

6. A signal generator as claimed in claim 4, said divide-by-two frequency divider including an exclusive nor gate having two inputs and an output, and a clock flip-flop having a data input, a clock input, and a Q output; the Q output being connected to one exclusive nor gate input of the divide-by-two divider, the output of the counter being connected to the other exclusive nor gate input of the divide-by-two counter, and the control signal output of the first divider circuit being connected to the clock input, the Q output thereby providing the square wave signal.

7. A signal generator as claimed in claim 5, the combining means including a plurality of nand gates each having a pair of inputs and an output, the dividing means having at successive outputs respectively each a successive division by two of the clock signal, the decoder having a plurality of outputs responsive to the duty-cycle-selection bits, the pair of inputs of each of the nand gates being coupled respectively to a different one of the dividing means successive outputs and to a different one of the decoder outputs, the outputs of the nand gates being coupled to a further nand gate having an output coupled to the chopper means.

8. A signal generator as claimed in claim 4, said first frequency divider circuit output at the frequency of the rectangular wave signal being coupled to the chopper means.

9. A signal generator as claimed in claim 1, the chopper means including a chopper exclusive nor gate having two inputs connected respectively to receive the square wave signal and the rectangular wave signal to produce the modulated output signal.

10. A signal generator as claimed in claim 4, further comprising a further exclusive nor gate having two inputs and an output, one input of the further exclusive nor gate being connected to receive an input from the divide-by-two frequency divider, the second input of the further exclusive nor gate being connected to receive the rectangular wave signal from the first divider circuit thereby to provide the modulated output at the further exclusive nor gate output.

11. A signal generator as claimed in claim 9, further comprising:
a further nor gate having two inputs and an output, one input of the further nor gate being connected to receive the output of the chopper exclusive nor gate;
a data input comprising an input of duty-cycle-selecting binary digits; and
a decoder having a binary digital output including a selected signal digit output responsive to the duty-cycle-selecting input binary digits;
the rectangular wave signal means being connected to respond to the binary digital output of the decoder, the further nor gate second input receiving an output from a single binary digit of the decoder output, whereby the output from the further nor gate is inhibited by a selected combination of the input duty-cycle-selecting binary digits which provides an inhibiting output of said single binary digit.

12. A signal generator as claimed in claim 1, further comprising:
means to modify the duty cycle of the rectangular wave, said means to modify having an output; and
a rectangular signal data flip-flop having an output signal providing the rectangular wave input to the chopper exclusive nor gate, one input of the rectangular wave signal data flip-flop being connected to receive the clock signal, the other input of the rectangular wave signal data flip-flop being connected to receive the output of the means to modify the duty cycle.

13. A signal generator as claimed in claim 5, said chopper means comprising:
a chopper exclusive nor gate having two inputs and an output, one input being connected to receive the rectangular wave signal and the other chopper nor gate input connected to receive the square wave, thereby to provide at the chopper exclusive nor gate output the modulated output.

14. A signal generator as claimed in claim 9,
the rectangular wave producing means including a decoder having an input responsive to duty cycle selecting binary digits and an output of binary digits to which the rectangular wave producing means is connected to be responsive,
said chopper means including a further exclusive nor gate having two inputs and an output, one input of the further exclusive nor gate being connected to receive the chopper nor gate output, the other input of the further exclusive nor gate being connected to receive the selected single digit output of the decoder.

15. A signal generator as claimed in claim 5, the divider means comprising a divider circuit in common with the means to provide the square wave signal and the means to provide the rectangular wave signal.

* * * * *